(12) United States Patent
Murai et al.

(10) Patent No.: US 7,834,213 B2
(45) Date of Patent: Nov. 16, 2010

(54) COLORANT COMPOUND AND METHOD OF MANUFACTURING THE SAME AS WELL AS BLUE RESIST COMPOSITION FOR USE IN COLOR FILTER CONTAINING THE SAME

(75) Inventors: Yasuaki Murai, Kawasaki (JP); Takayuki Toyoda, Yokohama (JP); Yuko Yamagishi, Tokyo (JP); Takeshi Miyazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 823 days.

(21) Appl. No.: 11/813,395

(22) PCT Filed: Feb. 14, 2006

(86) PCT No.: PCT/JP2006/302917
§ 371 (c)(1),
(2), (4) Date: Jul. 5, 2007

(87) PCT Pub. No.: WO2006/088171
PCT Pub. Date: Aug. 24, 2006

(65) Prior Publication Data
US 2008/0213698 A1 Sep. 4, 2008

(30) Foreign Application Priority Data
Feb. 15, 2005 (JP) .............................. 2005-037416

(51) Int. Cl.
*C07C 323/01* (2006.01)
*C07C 323/09* (2006.01)
*C07C 211/18* (2006.01)
*C07C 211/28* (2006.01)
*G03F 7/004* (2006.01)

(52) U.S. Cl. ............................. 564/85; 564/315; 430/7; 430/270.1

(58) Field of Classification Search ............... 430/270.1, 430/7; 564/315, 85; 568/22, 23, 24, 28; 552/114
See application file for complete search history.

(56) References Cited

U.S. PATENT DOCUMENTS

| | | | |
|---|---|---|---|
| 3,535,347 A | | 10/1970 | Bitterli |
| 3,925,094 A | * | 12/1975 | Papenfuss et al. ........... 106/493 |
| 4,000,118 A | * | 12/1976 | Dawson et al. .............. 528/391 |
| 4,039,467 A | * | 8/1977 | Tucker ........................ 252/587 |
| 4,258,118 A | * | 3/1981 | Foley et al. .................. 430/221 |
| 4,566,999 A | * | 1/1986 | Engelmann .................. 552/108 |
| 4,632,783 A | * | 12/1986 | Hung et al. .................. 552/111 |
| 5,449,812 A | * | 9/1995 | Schnabel et al. .............. 560/13 |
| 7,153,350 B2 | * | 12/2006 | Auslander et al. ......... 106/31.32 |
| 7,264,910 B2 | * | 9/2007 | Toyoda et al. .......... 430/108.21 |
| 7,288,357 B2 | * | 10/2007 | Toyoda et al. .......... 430/137.17 |
| 7,407,540 B2 | * | 8/2008 | Yamagishi et al. ....... 106/31.43 |
| 2003/0236437 A1 | * | 12/2003 | Smeltz et al. ............... 564/395 |

FOREIGN PATENT DOCUMENTS

| | | |
|---|---|---|
| JP | 2001-108815 A | 4/2001 |
| JP | 2002-338839 A | 11/2002 |
| JP | 2003-5361 A | 1/2003 |
| JP | 2003-5362 A | 1/2003 |
| JP | 7-242651 A | 7/2007 |

* cited by examiner

*Primary Examiner*—Sin J. Lee
*Assistant Examiner*—Anca Eoff
(74) *Attorney, Agent, or Firm*—Fitzpatrick, Cella, Harper & Scinto

(57) ABSTRACT

The present invention provides (I) a method of manufacturing a triphenylmethane colorant that can suppress the sub-reactions in conversion to a sulfonamide and is industrially advantageous, (II) a colorant compound that has both excellent spectral characteristics and a high solubility relative to organic solvents or polymers as a coloring agent to be used in color filters and (III) a blue resist composition for use in a color filter that shows a high lightness and an excellent hue particularly for blue color and can be used to display an image that is excellent in terms of spectral characteristics and contrast.

2 Claims, 2 Drawing Sheets

COLORANT COMPOUND AND METHOD OF MANUFACTURING THE SAME AS WELL AS BLUE RESIST COMPOSITION FOR USE IN COLOR FILTER CONTAINING THE SAME

TECHNICAL FIELD

This invention relates to a novel colorant compound, a method of manufacturing such a colorant compound and a blue resist composition for use in a color filter containing such a colorant compound.

BACKGROUND ART

Generally, in the field of organic synthetic chemistry, a sulfonamide compound is synthesized by means of a condensation reaction of a corresponding sulfonyl chloride compound and a corresponding amine, and the sulfonyl chloride compound is synthesized by chlorinating a sulfonic acid group. A similar process is used for forming a sulfonamide for a colorant of a dye or a pigment. A sulfonyl chloride is prepared for a colorant by using chlorosulfonic acid, phosphorus pentachloride or phosphorus trichloride when chlorinating a sulfonic acid group. However, known chlorination techniques are industrially not satisfactory because they are accompanied by a problem of sub-reactions that can arise at the time of chlorinating sulfonic acid groups, which sub-reactions are, for example, that a sulfonic acid group is introduced anew into the skeleton of the colorant or that the skeleton of the colorant is decomposed.

A method of using thionyl chloride for chlorinating a sulfonic acid group is disclosed in an attempt of avoiding such sub-reactions (see Japanese Patent Application Laid-Open No. H07-242651). However, the colorant that is the reaction substrate used in the disclosed chlorination technique is a xanthene type colorant and no technique that is applicable to a triphenylmethane type colorant has been reported so far.

Meanwhile, the advancement of science and technology has given rise to changes in the life style and colorants are currently being used in various industrial fields not only to dye or color various materials such as fiber, plastic and leather but also for the purpose of recording and displaying information. Particularly, as personal computers have rapidly become popular in recent years, there is a rapidly expanding demand for color liquid crystal displays. Color filters are indispensable for displaying color images on liquid crystal displays and are critical parts to their performances. Additionally, in line with the current dissemination of broadband systems, development of color filters that can realize enhanced spectral characteristics and a high contrast ratio has become an urgent issue for displaying high definition images.

Known methods for manufacturing color filters include the dyeing method, the printing method, the ink-jet method and the photoresist method. However, the photoresist method has been in the main stream in recent years because it can control the spectral characteristics of color filters in a reproducible manner and allows fine patterning operations because of the high resolution it provides.

Pigments are generally being used as coloring agents with the photoresist method. However, pigments have a certain size and hence accompany a depolarization effect. It has been known that the contrast ratio of color display of liquid crystal displays is reduced when pigments are used for coloring agents. Additionally, it is difficult to achieve a high transmission of backlight in a system using pigments to pose limits for improving the lightness of color filters. Furthermore, because pigments are insoluble in organic solvents or polymers, colored resist compositions are obtained in a dispersed state. However, it is difficult to stabilize the dispersion.

On the other hand, dyes are generally soluble in organic solvents or polymers and hence stable in colored resist compositions without giving rise to aggregation. Therefore, color filters prepared by using dyes as coloring agents do not accompany any depolarization effect and can achieve a high transmission of backlight because the dyes are dispersed on a molecular level. Color filters prepared by using dyes have been reported since they show excellent spectral characteristics and are adapted to display images with an enhanced display contrast.

A method of using C. I. Acid Blue 104, which is a triphenylmethane type colorant, as a colorant for blue color filters (see Japanese Patent Application Laid-Open No. 2003-5362) and a method of using C. I. Acid Red 6, which is a monoazo type colorant, as a colorant for red color filters (see Japanese Patent Application Laid-Open No. 2003-5361) have been disclosed. Of theses methods, the former method of using a triphenylmethane type colorant is particularly advantageous because of the high molar absorption coefficient ($\epsilon$) of the colorant and the vivid color tone and excellent spectral characteristics.

Furthermore, a method of using an anthraquinone type colorant as a colorant for blue color filters (Japanese Patent Application Laid-Open No. 2001-108815) and a method of using a naphthoquinone type colorant also as a colorant for blue color filters (Japanese Patent Application Laid-Open No. 2002-338839) have been disclosed.

DISCLOSURE OF THE INVENTION

However, the methods described in Japanese Patent Application Laid-Open Nos. 2003-5362 and 2003-5361 are accompanied by such problems that the solubility of the colorants relative to organic solvents or polymers is insufficient and hence the colorants can easily be eluted in a development process. On the other hand, the dyes described in Japanese Patent Application Laid-Open Nos. 2001-108815 and 2002-338839 are not satisfactory although they show a sufficient degree of solubility relative to organic solvents or polymers and excellent spectral characteristics. Therefore, as discussed above, no colorant that has both excellent spectral characteristics and a high solubility relative to organic solvents or polymers has been reported.

In view of the above-identified circumstances, it is the first object of the present invention to provide a method of manufacturing a triphenylmethane type colorant that can suppress the sub-reactions in the process of forming a sulfonamide and is industrially advantageous. The second object of the present invention is to provide a colorant compound that has both excellent spectral characteristics and a high solubility relative to organic solvents or polymers, as a coloring agent to be used in color filters. The third object of the present invention is to provide a blue resist composition for use in a color filter that shows a high lightness and an excellent hue particularly for blue color and can be used to display an image that is excellent in terms of spectral characteristics and contrast.

According to the present invention, the above objects are achieved by providing a colorant compound characterized by having a structure represented by the general formula (1) shown below:

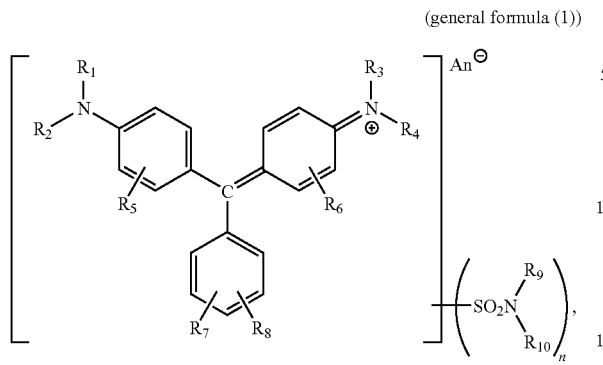

(general formula (1))

wherein each of $R_1$ through $R_4$ independently denotes a hydrogen atom, an alkyl group that may be substituted, an aryl group that may be substituted or an aralkyl group that may be substituted, each of $R_5$ and $R_6$ independently denotes a hydrogen atom or an alkyl group and each of $R_7$ and $R_8$ independently denotes a hydrogen atom, a sulfonic acid group, an amino group that may be substituted or $—SO_2NR_9R_{10}$, wherein each of $R_9$ and $R_{10}$ independently denotes a hydrogen atom, an alkyl group, an aryl group or an aralkyl group and may form a heterocycle with a nitrogen atom. Additionally, in the general formula (1), n denotes an integer between 1 and 3. If neither $R_7$ nor $R_8$ is $—SO_2NR_9R_{10}$, at least one of the $R_1$ through $R_4$ is an alkylene group, an arylene group or an aralkylene group having $—SO_2NR_9R_{10}$ as a substituent. In the general formula (1), An denotes a counter anion, which is not necessary when a counter anion exists in the molecule.

Preferably, in a colorant compound according to the invention as defined above, the colorant compound has a structure as represented by general formula (2) shown below:

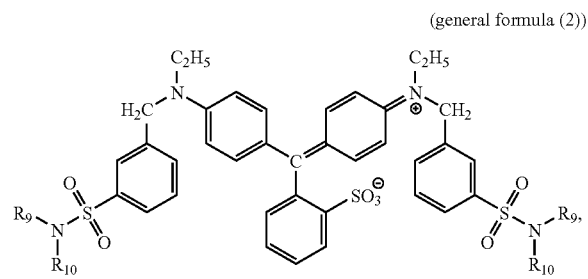

(general formula (2))

where $R_9$ and $R_{10}$ independently denotes a hydrogen atom, an alkyl group, an aryl group or an aralkyl group and may form a heterocycle with a nitrogen atom.

According to the present invention, there is also provided a method of manufacturing a sulfonylhalide compound having a structure as represented by general formula (4) shown below, which is useful for manufacturing a colorant compound according to the invention. The manufacturing method comprises a step of causing a colorant compound having a structure as represented by general formula (3) shown below and a thionyl halide to react with each other in the presence of N,N-dimethylformamide and an organic solvent:

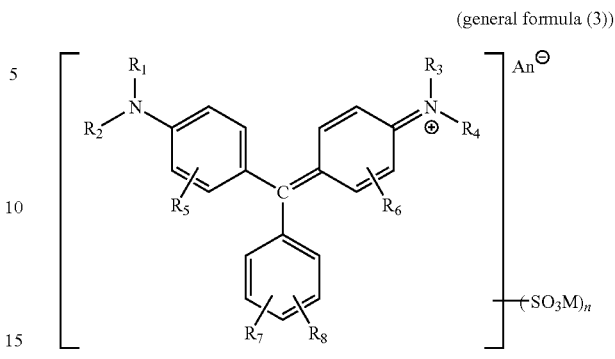

(general formula (3))

wherein each of $R_1$ through $R_4$ independently denotes a hydrogen atom, an alkyl group that may be substituted, an aryl group that may be substituted or an aralkyl group that may be substituted, each of $R_5$ and $R_6$ independently denotes a hydrogen atom or an alkyl group, each of $R_7$ and $R_8$ independently denotes a hydrogen atom, a sulfonic acid group, an amino group that may be substituted or $—SO_3M$ and n denotes an integer between 1 and 3, at least one of the $R_1$ through $R_4$ being an alkylene group, an arylene group or an aralkylene group having $—SO_3M$ as a substituent if neither $R_7$ nor $R_8$ is $—SO_3M$. In the general formula (3), M denotes a counter cation of a sulfonic group and An denotes a counter anion, although An is not necessary when a counter anion exists in the molecule.

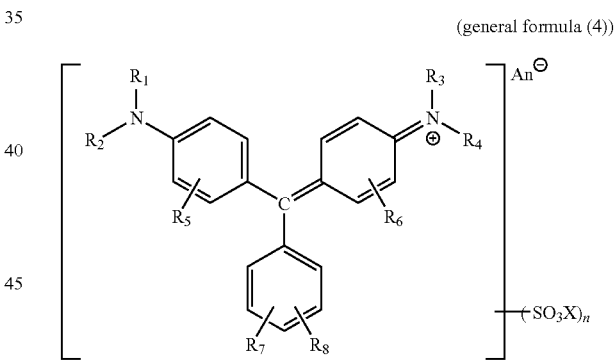

(general formula (4))

wherein each of $R_1$ through $R_4$ independently denotes a hydrogen atom, an alkyl group that may be substituted, an aryl group that may be substituted or an aralkyl group that may be substituted, each of $R_5$ and $R_6$ independently denotes a hydrogen atom or an alkyl group, each of $R_7$ and $R_8$ independently denotes a hydrogen atom, a sulfonic acid group, an amino group that may be substituted or $—SO_3X$ and n denotes an integer between 1 and 3, at least one of the $R_1$ through $R_4$ being an alkylene group, an arylene group or an aralkylene group having $—SO_3X$ as a substituent if neither $R_7$ nor $R_8$ is $—SO_3X$. In the general formula (4), X denotes a halogen atom and An denotes a counter anion, although An is not necessary when a counter anion exists in the molecule.

According to the present invention, there is also provided a method of manufacturing a colorant compound according to the invention. A manufacturing method according to the invention comprises a step of causing a sulfonylhalide compound having a structure as represented by the general formula (4) obtained by a method of manufacturing a sulfonylhalide compound having a structure as defined above and an amine having a structure as represented by general formula (5) below to react with each other to conduct condensation reaction:

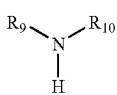

(general formula (5))

wherein each of $R_9$ and $R_{10}$ independently denotes a hydrogen atom, an alkyl group, an aryl group or an aralkyl group and may form a heterocycle with a nitrogen atom.

According to the present invention, there is also provided a blue resist composition for use in a color filter comprising a resin or a monomer and at least a colorant compound having a structure as represented by the above general formula (1).

Thus, the present invention provides a novel colorant compound that is excellent in terms of spectral characteristics such as color developability and transparency and an industrially advantageous method of manufacturing such a colorant compound. It is possible to control the solubility of a novel colorant compound according to the present invention relative to organic solvents by changing the type of amines to be used in the condensation reaction in the process of manufacturing the colorant compound. The present invention provides a resist composition for use in a color filter showing an excellent blue color tone by using such a novel colorant compound.

BEST MODE FOR CARRYING OUT THE INVENTION

Figure 1:
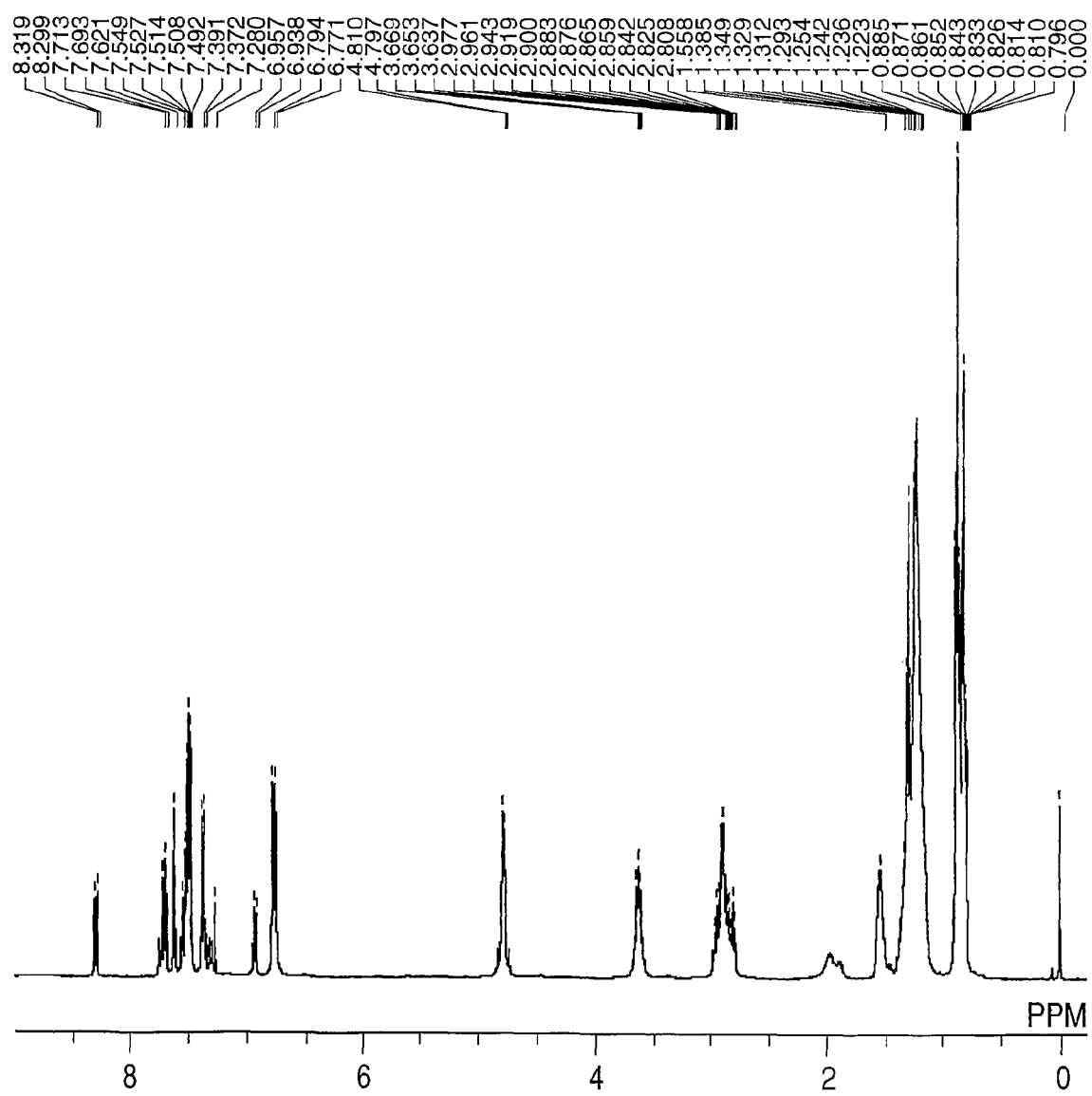
FIG. 1 is a $_1$H NMR spectrum (400 MHz, CDCl$_3$, room temperature) of a colorant compound (10) according to the present invention.

Now, the present invention will be described in greater detail by referring to preferred embodiments of the invention.

As a result of intensive research efforts for solving the above-identified problems of the prior art, the inventors of the present invention found that a colorant compound having a structure as represented by the above general formula (1) shows excellent spectral characteristics such as color developability and transparency to get to the present invention. It is possible to control the solubility of a colorant compound as represented by the general formula (1) relative to organic solvents by changing the type of amines when forming a sulfonamide in the process of manufacturing the colorant compound. It is also possible to provide a color filter showing an excellent blue color tone by using such a colorant compound for a resist composition.

Alkyl groups that can be used for each of $R_1$ through $R_4$ in the above general formulas (1), (3) and (4) include a methyl group, an ethyl group, an n-propyl group, an isopropyl group, an n-butyl group, a sec-butyl group, a tert-butyl group, an n-pentyl group and an n-hexyl group. Aryl groups that can be used for each of $R_1$ through $R_4$ include a phenyl group, a 1-naphthyl group and a 2-naphthyl group. Aralkyl groups that can be used for each of $R_1$ through $R_4$ include a benzyl group and a phenethyl group. $R_1$ and $R_3$ (or $R_1$ and $R_4$) may be the same with or different from each other, and $R_2$ and $R_4$ (or $R_2$ and $R_3$) may be the same with or different each other, although they are preferably the same from the viewpoint of color tone and raw material cost. It is particularly preferable that they are all ethyl groups or that $R_1$ and $R_3$ (or $R_1$ and $R_4$) are ethyl groups and $R_2$ and $R_4$ (or $R_2$ and $R_3$, whichever appropriate) are benzyl groups. These substituents may be substituted by $SO_2NR_9R_{10}$.

Alkyl groups that can be used for each of $R_5$ and $R_6$ in the above general formulas (1), (3) and (4) include a methyl group, an ethyl group, an n-propyl group and an isopropyl group. Preferably, each of $R_5$ and $R_6$ may be either a hydrogen atom or a methyl group.

The amino group of each of $R_7$ and $R_8$ in the above general formulas (1), (3) and (4) may be substituted by an alkyl group such as a methyl group and an ethyl group, a phenyl group, a methoxyphenyl group, an ethoxyphenyl group or a benzenesulfonic acid group. $R_9$ and $R_{10}$ in the above general formula (1) correspond to a substitution residue group of an amine represented by the above general formula (5).

Since $R_9$ and $R_{10}$ in the above general formula (5) significantly influence the solubility of a colorant compound represented by the general formula (1), it is possible to obtain a colorant compound showing a desired level of solubility by changing the substituent of each of $R_9$ and $R_{10}$. Examples of substituents that can be used for each of $R_9$ and $R_{10}$ include chain or cyclic alkyl groups such as a methyl group, an ethyl group, an n-propyl group, an isopropyl group, an n-butyl group, a sec-butyl group, a tert-butyl group, an n-pentyl group, an n-hexyl group, an n-pentyl group, an n-octyl group, a 2-echylhexyl group and a cyclohexyl group as well as aryl groups such as a phenyl group a 1-naphthyl group and a 2-naphthyl group and aralkyl groups such as a benzyl group and a phenethyl group.

Each of $R_9$ and $R_{10}$ may form a heterocycle with a nitrogen atom. Specific examples of such heterocyclic groups include a piperazino group, a piperidino group, a pyrrole group, an indol group, a carbazole group, a pyrazole group, an indazole group, an imidazole group, a benzimidazole group, a triazole group, a benzotriazole group and a tetrazole group. From the viewpoint of reactivity for sulfonamidation, it is, preferable that the substituent of each of $R_9$ and $R_{10}$ shows a small steric hindrance because the reactivity of, the general formula (5) is high when such a substituent is used and a colorant compound represented by the general formula (1) can be produced at a high yield. From the viewpoint of solubility for organic solvents, it is preferable that each of $R_9$ and $R_{10}$ is a long chain alkyl group or the like that is highly oil-soluble.

Now, a method of manufacturing a novel colorant compound to be used for the purpose of the present invention will be described below. The method of manufacturing a colorant compound according to the present invention comprises a step of obtaining a sulfonylhalide having a structure represented by the general formula (4) as mentioned above by halogenization of a sulfonic group in a colorant compound represented by the general formula (3) as described above and a step of subsequently obtaining a colorant compound represented by the above general formula (1) by causing a condensation reaction to take place between the sulfonylhalide compound and an amine having a structure represented by the above general formula (5).

Specific examples of M in the general formula (3) include a hydrogen atom and a metal ion such as a sodium ion, a lithium ion and a potassium ion. Specific examples of X in the general formula (4) include halogen atoms such as a chlorine atom and a bromine atom.

Specific examples of colorant compounds having a structure represented by the general formula (3) non-limitatively include those having a structure represented by any of general formulas (6) through (9) listed below.

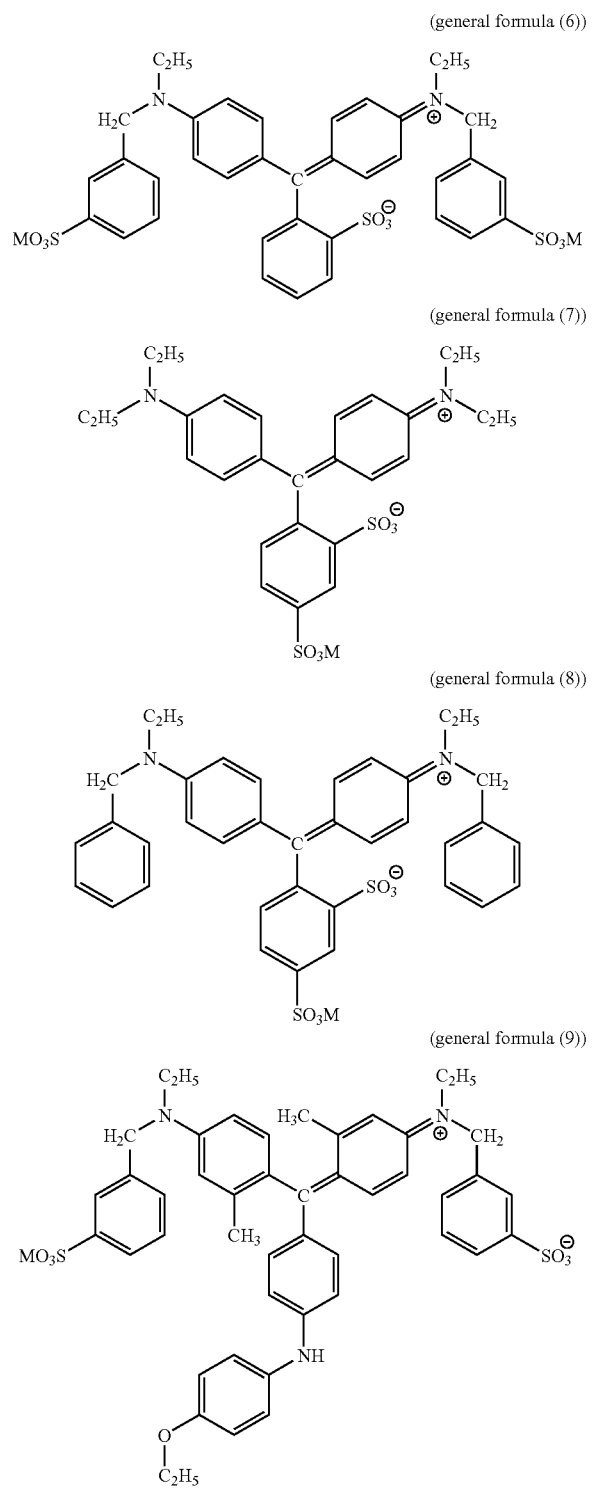

wherein M denotes a counter cation of a sulfonic group as in the above general formula (3).

Any of the above colorant compounds is caused to react with a thionyl halide by itself or as a mixture of two or more than two such colorant compounds. Thionyl chloride is preferable among thionyl halides. The use of a solvent of a halogenated aliphatic hydrocarbon compound is preferable as a reaction solvent. Specific examples of halogenated aliphatic hydrocarbons include chloroform, methylene chloride, carbon tetrachloride, 1,2-dichloroethane, dichloroethylene, trichloroethylene, perchloroethylene, dichloropropane, amyl chloride, dichloropentane, tetrachloroethane and 1,2-dibromoethane, of which chloroform is preferable.

In the reaction of a colorant compound represented by the general formula (3) with thionyl halide, the amount ratio of thionyl halide (A) relative to N,N-dimethylformamide (B), or A:B, is preferably within a range between 1:0.3 and 1:0.8. While the amount of thionyl halide (A) varies depending on the type and the purity of the colorant compound (C) to be used, the amount ratio of thionyl halide (A) relative to the colorant compound (C) to be used, or A:C, is normally within a range between 1:1 and 1:20. Generally speaking, the amount of thionyl halide to be used may be stoichiometrically equivalent or slightly excessive when the colorant compound shows a high degree of purity. On the other hand, thionyl halide is preferably used in an amount that is stoichiometrically much excessive when the colorant compound shows a low colorant purity because it contains impurities such as common salt and/or mirabilite to a large extent. The reaction is normally conducted by gradually dropping thionyl halide into a mixture of a colorant compound of the general formula (3), N,N-dimethylformamide and a solvent of a halogenated aliphatic hydrocarbon compound. The reaction temperature is normally between about 0° C. and about 70° C., preferably between about 30° C. and 60° C., and the reaction time is normally between 30 minutes and 6 hours. The amount of a halogenated aliphatic hydrocarbon compound is used may be selected appropriately.

The sulfonylhalide compound represented by the general formula (4) is normally taken out form the reaction mixture by means of a conventional technique including extraction, washing and condensation, if necessary after cooling the reaction mixture, after decomposing the remaining thionyl halide by pouring the mixture into water or ice water. Preferably, the obtained reaction mixture (the solvent solution of a halogenated aliphatic hydrocarbon compound containing the sulfonylhalide compound and the remaining thionyl halide) is subjected to the condensation reaction with the amine represented by the above general formula (5) without further treatment.

The condensation reaction of the sulfonylhalide compound represented by the general formula (4) and the amine represented by the general formula (5) is conducted preferably in the presence of a basic catalyst, which may typically be an aliphatic or aromatic amine. Specific examples of aliphatic or aromatic amines that can be used as a basic catalyst for the condensation reaction include triethylamine, pyridine, piperidine, piperazine and triethanolamine. The use of a tertiary amine is preferable. When the reaction mixture is subjected to a reaction with the amine represented by the general formula (5) without further treatment and a basic catalyst is used, the molar ratio of the total amount (D) of the amine represented by the general formula (5) and the above described basic catalyst relative to the amount (A) of thionyl halide to be used in the above reaction, or D:A, is preferably within a range between 1:2.2 and 1:2.5.

When a basic catalyst is used, the molar ratio of the catalyst (E) relative to the amine (F) represented by the general formula (5), or E:F, is within a range between 1:0.5 and 1:1.5, preferably between 1:0.8 and 1:1.2. The amount of the condensation reaction solvent such as a halogenated aliphatic hydrocarbon compound to be used may be selected appropriately. The condensation reaction temperature is normally between 0° C. and 60° C., preferably between 5° C. and 40° C., and the reaction time is normally between 30 minutes and 6 hours. The colorant compound represented by the general formula (1) is normally taken out from the condensation reaction mixture by means of a conventional technique including neutralization, extraction, washing and condensation, if necessary after cooling the reaction mixture. Preferably, a technique of condensing the solvent and refining it by recrystallization or by means of column chromatography after the neutralization, the extraction and the washing may be used.

A colorant compound according to the invention shows a clear blue color tone and can suitably be used as a coloring material, preferably as a coloring agent for color filters because of its spectral characteristics. More specifically, it can be used as a material for preparing a blue resist composition as well as a printing ink, paint and writing ink.

Now, a blue resist composition for use in a color filter according to the present invention will be described below.

A blue resist composition according to the invention contains at least either one of binder resin and a photo-polymerizing monomer and a colorant compound as represented by the above general formula (1). Preferably, a blue resist composition according to the invention further contains a photo-polymerization initiator and a solvent.

In a color filter formed by arranging two or more different types of pixels having different spectral characteristics on a substrate, at least one of the pixels (e.g., red, green or blue) can be made to show a high degree of transparency and color purity by using a colorant compound according to the invention as represented by the general formula (1). Additionally, since the spectral characteristics can be improved by using a mixture of a pigment and a dye, a mixture of a pigment and a colorant compound according to the present invention may be used for a color filter. Additionally, some other dye may be additionally used as a color adjusting agent to regulate the spectral characteristics. A colorant to be used for a color filter that contains a colorant compound according to the present invention may be either water-soluble or oil-soluble. While it is preferable that the dye is completely dissolved, it is not necessary to dissolve the dye if it can be dispersed as sufficiently fine particles. Thus, many commercially available coloring agents may selectively be used for the purpose of the present invention.

Specific examples of colorants that can be used as color adjusting agents for a color filter according to the present invention non-limitatively include Acid Red 52, 87, 92, 122 and 486, Solvent Red 8, 24, 83, 109, 125 and 132, Disperse Red 60, 72, 88 and 206, Basic Red 12 and 27, Acid Blue 1, 7, 9, 40, 83, 90, 129 and 249, Solvent Blue 25, 35, 36, 55, 67 and 70, Disperse Blue 56, 81, 60, 87, 149, 197, 211 and 214, Basic Blue 1, 7, 26 and 77, Acid Green 18, Solvent Green 3, Basic Green 1, Acid Yellow 38 and 99, Solvent Yellow 25, 88, 89 and 146, Disperse Yellow 42, 60, 87 and 198 and Basic Yellow 21.

Specific examples of pigments that can be used for a color filter according to the present invention non-limitatively include Pigment Red 9, 19, 38, 43, 97, 122, 123, 144, 149, 166, 168, 177, 179, 180, 192, 208, 215, 216, 217, 220, 223, 224, 226, 227, 228 and 240, Pigment Blue 15, 15:6, 16, 22, 29; 60 and 64, Pigment Green 7 and 36, Pigment Yellow 20, 24, 81, 83, 86, 93, 108, 109, 110, 117; 125, 137, 138, 139, 147, 148, 153, 154, 166, 168 and 185, Pigment Orange 36 and Pigment Violet 23. Two or more of these dyes or pigments may be mixed for use in order to achieve a desired hue.

The content of a colorant compound as represented by the above general formula (1) is preferably between 0.1 and 400 mass %, more preferably between 1 and 200 mass % relative to the mass of the binder resin, which will be described in greater detail hereinafter.

While no particular limitations are posed to the binder resin to be used for a blue resist composition in a color filter according to the present invention so long as the light irradiation portion or the light shielding portion thereof is soluble in an organic solvent, an aqueous alkali solution, water or a commercially available developer, the use of binder resins having a composition that can be developed in water or alkali is desirable from the viewpoint of handling and waste disposal.

Such binder resins include those obtained by copolymerizing hydrophilic monomers such as those having (meth)acrylic acid, 2-hydroxyethyl, acryl amide, N-vinylpyrrolidone, or an ammonium salt and lipophilic monomers such as a (meth)acrylate, vinyl acetate, styrene or N-vinylcarbazole at an appropriate mixing ratio by way of a known process. Such a binder resin can be used as resist of the negative type whose light shielding portion can be removed by development when combined with radical-polymerizing monomers having an ethylenically unsaturated group or cation-polymerizing monomers having an oxirane ring or an oxetane ring and a radical generator, an acid generator or a base generator.

Alternatively, a binder resin selected from tert-butyl carbonate, tert-butylester, tetrahydroxypyranyl ester or tetrahydroxypyranyl ether of polyhydroxystyrene may be used. Such a binder resin can be used as a resist of the positive type whose light irradiation portion can be removed by development when combined with an acid generator.

A blue resist composition for use in a color filter may contain a photo-polymerizing monomer having one or more ethylenically unsaturated double bonds as a monomer having an ethylenically unsaturated double bond to be used for addition polymerization by way of irradiation of light. Such a photo-polymerizing monomer may be selected from compounds having at least one ethylenically unsaturated group that can be used for addition polymerization in the molecule and a boiling point of not lower than 100° C. under the atmospheric pressure. Examples of such compounds include monofunctional (meth)acrylates such as polyethyleneglycolmono(meth)acrylate, polypropyleneglycolmono(meth)acrylate and phenoxyethyl(meth)acrylate, polyfunctional (meth)acrylates such as polyethyleneglycoldi(meth)acrylate, polypropyleneglycoldi(meth)acrylate, trimethylolethanetri (meth)acrylate, trimethylolpropanetri(meth)acrylate, trimethylolpropanedi(meth)acrylate, neopentylglycoldi(meth)acrylate, pentaerithritoltetra(meth)acrylate, pentaerithritoltri (meth)acrylate, dipentaerithritolhexa(meth)acrylate, dipentaerithritolpenta(meth)acrylate, hexanediol(meth)acrylate, trimethyrolpropanetri(acryloyloxypropyl)ether, tri (acryloyloxyethyl)isocyanurate, tri(acryloyloxyethyl)cyanurate and glycerintri(meth)acrylate and polyfunctional acrylates and polyfunctional methacrylates obtained by adding ethylene oxide or propylene oxide to a polyfunctional alcohol such as trimethylolpropane or glycerin and subsequently turning it into a (meth)acrylate.

Examples of such compounds further include urethane acrylates, polyester acrylates, epoxy acrylates that are reaction products of epoxy resins and (meth)acrylic acids and other polyfunctional (meth)acrylates. Of the above listed examples, trimethylolpropanetri(meth)acrylate, pentaerithritoltetra(meth)acrylate and dipentaerithritolhexa(meth)acrylate, dipentaerithritolpenta(meth)acrylate are preferable.

A photo-polymerizing monomer having two or more ethylenically unsaturated double bonds may be used alone or two or more of them may be mixed for use. The content of the polymerizing compound is generally between 5 and 50 mass % relative to the mass of the coloring photosensitive composition (total solid component), preferably between 10 and 40 mass %. The photosensitivity and the strength of the pixels can be reduced when the content falls below 5 mass %, whereas the stickiness of the photosensitive resin layer can become too much when the content exceeds 50 masse.

A blue resist composition for use in a color filter is so composed as to contain a photo-polymerization initiator when it is cured by ultraviolet rays. Photo-polymerization initiators that can be used for the purpose of the present invention include vicinalpolyketoaldonyl compounds, α-carbonyl compounds, acyloin ethers, multi-branch quinone compounds, combinations of a triarylimidazole dimer and a p-aminophenylketone, and trioxadiazole compounds, among which 2-benzyl-2-dimethylamino-1-(4-morpholinophenyl) butanone (IRGACURE 369: tradename, available from Ciba Specialty Chemicals) is preferable. The use of a photo-polymerization initiator is not indispensable when electron beams are used to form pixels by means of the colored resist according to the present invention.

A blue resist composition for use in a color filter according to the present invention contains a solvent for dissolving or dispersing the binder resin, the photo-polymerizing monomer, the photo-polymerization initiator, the coloring agent and so on, which are described above. Solvents that can be used for the purpose of the present invention include cyclohexanone, ethyl cellosolve acetate, butyl cellosolve acetate, 1-methoxy-2-propylacetate, diethylene glycol dimethyl ether, ethyl benzene, 1,2,4-trichlorobenzene, ethylene glycol diethyl ether, xylene, ethyl cellosolve, methyl-n-amyl ketone, propylene glycol monomethyl ether, toluene, methyl ethyl ketone, ethyl acetate, methanol, ethanol, isopropyl alcohol, butanol, isobutyl ketone and petroleum type solvents. These solvents may be used alone or in combination of two or more of them.

As described above, since a blue resist composition for use in a color filter according to the present invention contains a colorant compound as represented by the above general formula (1) as a coloring agent, the pixels formed by using it show an excellent hue and an improved transparency as well as an improved light transmittance.

EXAMPLES

Now, the present invention will be described further in greater detail by way of examples and comparative examples, although the present invention is by no means limited to the examples. In the following description, "parts" and "%" are parts by mass and mass % unless noted otherwise.

Example 1

A colorant compound having a structure as represented by the above general formula (1) is obtained in a manner as described below.

Synthesis Example

Manufacturing a Colorant Compound as Defined by General Formula (10) Shown Below

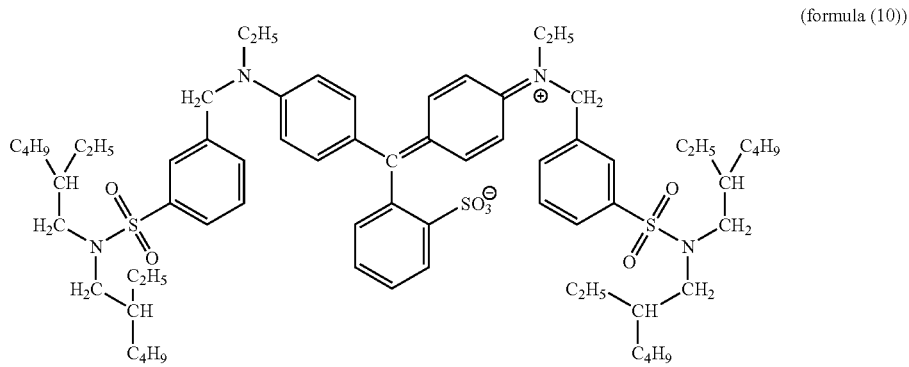

(formula (10))

5.1 mL of thionyl chloride was dropped into a mixture of 10 g of a colorant compound represented by the above general formula (6), where M is sodium salt, 80 mL of chloroform and 2.4 g of N,N-dimethylformamide, over one hour, at room temperature. After completing the dropping, the temperature of the solution was raised to 60° C. and stirred for 3 hours at this temperature. Then, a mixture of 15.5 g of di(2-ethylhexyl)amine and 7.7 g of triethylamine was dropped into the obtained reaction mixture, over one hour at 0° C. After completing the dropping, the temperature of the solution was raised to 60° C. and stirred for 3 hour at this temperature. After the completion of the reaction, the reaction mixture was neutralized by acetic acid and poured into 250 mL of water. Then, the reaction mixture was subjected to an extraction process by using chloroform and the organic layer was washed with 250 mL of water. After drying the organic layer by means of anhydrous mirabilite, the precipitate was filtered and the solvent in the filtration liquid was distilled off. Then, the distillation residue was refined by means of column chromatography to obtain a compound represented by the formula (10).

The structure of the compound was identified by means $_1$H and $_{13}$C NMR analysis, using a nuclear magnetic resonance spectrochemical analyzer (ECA-400: tradename, available from JEOL), and the purity of the obtained compound was checked by means of HPLC (high performance liquid chromatography, LC2010A: tradename, available from SHIMADZU). The results of the analysis are shown below.

(results of analysis of compound represented by formula (10))

(1) Results of $_1$H NMR (400 MHz, CDCl$_3$, room temperature) (FIG. 1):

δ=0.80-0.89 (m, 24H), 1.22-1.39 (m, 42H), 2.81-3.00 (m, 8H), 3.60-3.70 (m, 4H), 4.75-4.85 (m, 4H), 6.77-6.79 (m, 4H), 6.95 (dd, 1H), 7.32 (d, 1H), 7.38 (m, 2H), 7.49-7.57 (m, 7H), 7.62 (br, 2H), 7.69-7.75 (m, 2H), 8.31 (d, 1H)

(2) Results of $_{13}$C NMR (100 MHz, CDCl$_3$, room temperature):

δ=10.1, 12.5, 14.0, 23.0, 23.4, 28.6, 30.3, 37.7, 46.6, 53.4, 113.2, 125.2, 126.6, 126.8, 128.0, 128.7, 129.1, 130.0, 130.1, 130.3, 130.4, 136.2, 137.0, 140.4, 141.7, 147.4, 156.1, 182.1

(3) Results of HPLC: purity=96.7 area %, retention time: 9.3 minutes (MeOH/H$_2$O=95/5)

A series of colorant compounds represented by the above general formula (2) were synthesized by using the manufacturing method in the above described synthesis example. Tables 1 and 2 below illustrate R$_9$ and R$_{10}$ in the synthesized series of colorant compounds. Colorant compounds were also synthesized by way of a similar process except that colorant compounds represented by the above general formulas (7) through (9) were used in place of the colorant compound represented by the general formula (6). The series of the synthesized colorant compounds are listed in Table 3 below.

Example 2

Evaluation of Solubility of Colorant Compounds

The solubility of each of the series of the synthesized colorant compounds (10) through (27) to cyclohexanone was evaluated by referring to the ranking system shown below. As compounds for comparison, those in which M of the colorant compound represented by the above general formula (6) was sodium salt were also evaluated in a similar manner. Tables 1 through 3 also show the obtained results.

A: The solubility to cyclohexanone is not lower than 10%.

B: The solubility to cyclohexanone is not lower than 5% and lower than 10%.

C: The solubility to cyclohexanone is lower than 5%.

TABLE 1

Evaluation of Solubility of Colorant Compounds of Formulas (10) through (18) to Cyclohexanone

| compound No. | R$_9$ | R$_{10}$ | solubility |
|---|---|---|---|
| (10) | C$_4$H$_9$CH(C$_2$H$_5$)CH$_2$— | C$_4$H$_9$CH(C$_2$H$_5$)CH$_2$— | A |
| (11) | C$_6$H$_{13}$— | C$_6$H$_{13}$— | A |
| (12) | cyclohexyl-H | cyclohexyl-H | A |
| (13) | (CH$_3$)$_2$CH$_2$— | (CH$_3$)$_2$CH$_2$— | B |
| (14) | C$_2$H$_5$— | phenyl | B |
| (15) | benzyl | benzyl | A |
| (16) | phenyl | phenyl | B |

TABLE 1-continued

Evaluation of Solubility of Colorant Compounds of Formulas (10) through (18) to Cyclohexanone

| compound No. | R$_9$ | R$_{10}$ | solubility |
|---|---|---|---|
| (17) | phenyl | 1-naphthyl | B |
| (18) | phenyl | 2-naphthyl | B |

TABLE 2

Evaluation of Solubility of Colorant Compounds of Formulas (19) through (24) to Cyclohexanone

| compound No. | R$_9$ | R$_{10}$ | solubility |
|---|---|---|---|
| (19) | | benzyl-piperidinyl | B |
| (20) | | phenyl-piperazinyl | B |
| (21) | | N-methylindolyl | B |
| (22) | | N-methylindazolyl | B |
| (23) | | N-methylbenzimidazolyl | B |
| (24) | | N-methylbenzotriazolyl | B |

TABLE 3

Evaluation of Solubility of Colorant Compounds of Formulas (6) and (25) through (27) to Cyclohexanone

| compound No. | colorant compound used | $R_9$ | $R_{10}$ | An | solubility |
|---|---|---|---|---|---|
| (6) | — | — | — | — | C |
| (25) | (7) | $C_4H_9CH(C_2H_5)CH_2$— | $C_4H_9CH(C_2H_5)CH_2$— | — | A |
| (26) | (8) | $C_4H_9CH(C_2H_5)CH_2$— | $C_4H_9CH(C_2H_5)CH_2$— | — | A |
| (27) | (9) | $C_4H_9CH(C_2H_5)CH_2$— | $C_4H_9CH(C_2H_5)CH_2$— | Cl | A |

From the results listed in Tables 1 through 3, it was found that a colorant compound represented by the general formula (1) according to the present invention shows a dramatically improved solubility to cyclohexanone because of its sulfonamide group if compared with a colorant compound represented by the general formula (3). This fact suggests that it is possible to obtain a resist composition that does not give rise to aggregation and remains stable when used for a coloring agent by using a colorant compound having a sulfonamide group according to present invention. A colorant compound as represented by the general formula (1) shows an excellent solubility to cyclohexanone particularly when $R_9$ and $R_{10}$ are alkyl groups, long chain alkyl groups in particular.

Example 3

Evaluation of Spectral Characteristics of Colorant Compounds

Figure 2:
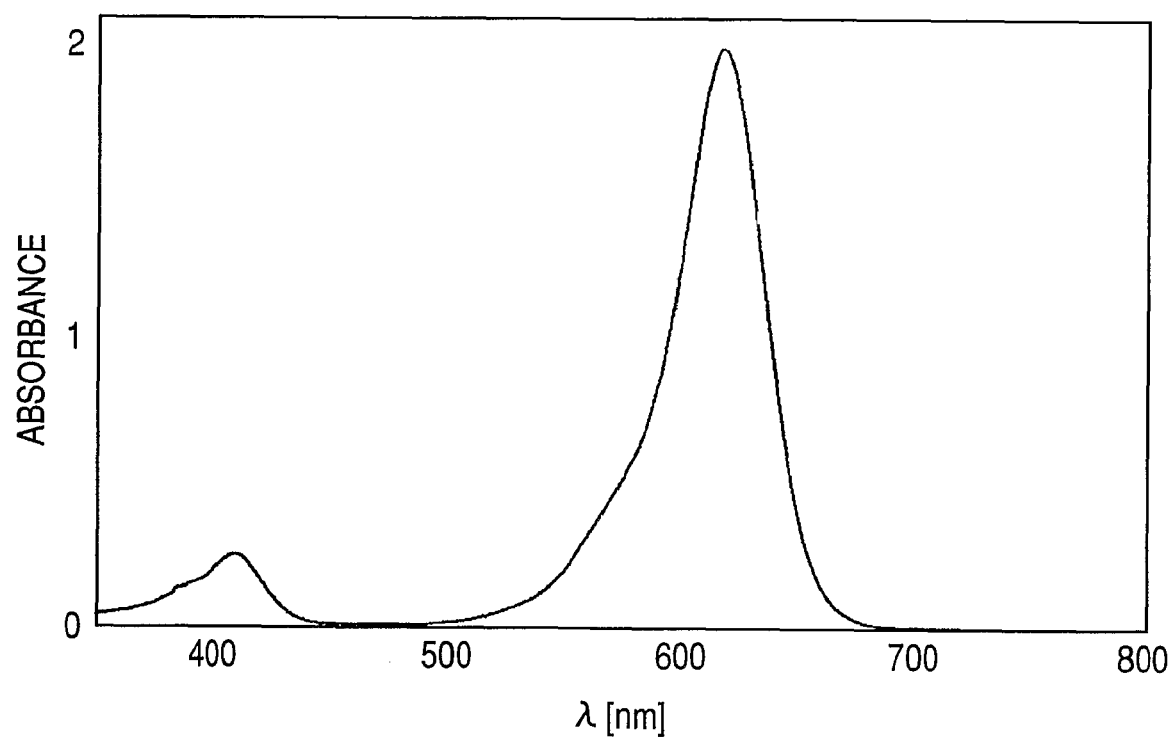
FIG. 2 is a UV visible absorption spectrum of the colorant compound (10) at room temperature when dissolved in cyclohexane.

The colorant compounds represented by the formula (10) was dissolved in cyclohexanone and regulated so as to show an absorbance of 2.0. The obtained solution was observed for UV visible absorption spectrum at room temperature by means of a spectro photometer (U-3310 Spectro Photometer: tradename, available from Hitachi) (FIG. 2). The absorption peak wavelength ($\lambda_{max}$ [nm]) was determined from the spectrum obtained by the observation. The spectral characteristics of the colorant compound were evaluated by the absorbance ratio of the largest absorption wavelength of the spectrum in the range of 500 to 650 nm to the smallest absorption wavelength of the spectrum in the range of 400 to 500 nm (the absorbance at the largest absorption wavelength/the absorbance at the smallest absorption wavelength). It is possible to prepare a color filter having pixels that show a high degree of lightness when the absorbance ratio is large.

While the lightness can be evaluated by means of the Y value of the XYZ standard calorimetric system established by CIE (Commission Internationale de l'Eclairage), the lightness was evaluated by means of the absorbance ratio in this example because the Y value can vary remarkably when the hue is shifted slightly.

The same evaluation process as described above was conducted for spectral characteristics except that the colorant compound represented by the formula (10) was replaced with the colorant compounds represented by the formulas (14), (25) through (27) and (28), the colorant compound represented by the formula (28) being an anthraquinone type dye of C. I. Solvent Blue 35. The obtained results are summarily listed in Table 4 below.

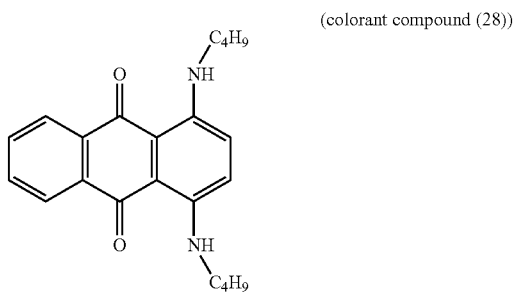

(colorant compound (28))

TABLE 4

Results of Evaluation of Spectral Characteristics

| compound No. | $\lambda_{max}$ [nm] | absorbance ratio |
|---|---|---|
| (10) | 619 | 433 |
| (14) | 620 | 434 |
| (25) | 631 | 185 |
| (26) | 617 | 140 |
| (27) | 621 | 130 |
| (28) | 620 | 77 |

From the results listed in Table 4 and by comparing the formulas (10) and (14), it was found that the colorant compounds having the same colorant skeleton do not show any remarkable difference in terms of spectral characteristics. Additionally, the series of the colorant compounds represented by the general formula (1) show spectral characteristics much better than the colorant compound (28) that is an anthraquinone type colorant. Particularly, the colorant compounds having a colorant skeleton represented by the above general formula (2) show an excellent lightness and also excellent spectral characteristics when used as coloring agents for color filters.

Example 4

Preparation of Blue Resist Composition 2.0 parts of the colorant compound (10) obtained in Synthesis Example 1 was added to 6.7 parts of an acryl copolymer composition, 1.3 parts of dipentaerithritol penta(meth)acrylate, 0.4 parts of 2-benzyl-2-dimethylamino-1-(4-morpholinophenyl)butanone-1 (photo-polymerization initiator) and 116 parts of cyclohexane and the mixture was stirred at room temperature for 3 hours. A blue resist composition was obtained by filtering the resultant mixture by means of a 1.5 μm filter.

Example 5

Preparation of an Applied Sample

The blue resist composition obtained by means of the above-described process was applied to a glass plate by spin coating and dried at 90° C. for 3 minutes. Subsequently, the entire surface was exposed to light and subjected to a post curing process at 180° C. to prepare an applied sample. The applied sample showed excellent transmission and color tone.

INDUSTRIAL APPLICABILITY

A colorant compound according to the invention can be applicable to a variety of uses because it is highly soluble in organic solvents and the solubility can be easily controlled depending on the use by changing the type of amines to be used for solfonamidation. Thus, a colorant compound according to the invention can be applicable not only for use in coloring agents but also in electronic materials such as optical recording colorants because of its remarkable physical properties.

This application claims priority from Japanese Patent Application No. 2005-037416 filed on Feb. 15, 2005, which is hereby incorporated by reference herein.

The invention claimed is:

1. A method of manufacturing a sulfonylhalide compound having a structure represented by general formula (4), comprising a step of causing a colorant compound represented by general formula (3) and a thionyl halide to react with each other in the presence of N,N-dimethylformamide and an organic solvent:

general formula (3)

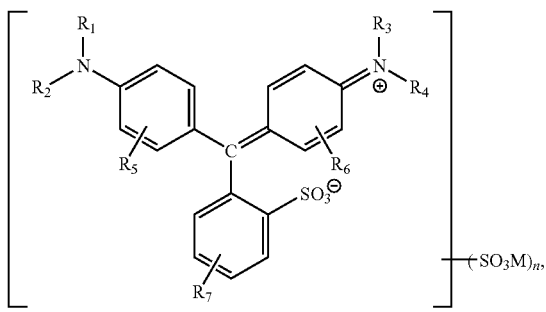

wherein each of $R_1$ through $R_4$ independently denotes a hydrogen atom, an alkyl group that may be substituted, an aryl group that may be substituted or an aralkyl group that may be substituted, each of $R_5$ and $R_6$ independently denotes a hydrogen atom or an alkyl group, $R_7$ denotes a hydrogen atom, a sulfonic acid group, an amino group that may be substituted or —$SO_3M$; n denotes an integer between 1 and 3; at least one of the $R_1$ through $R_4$ is an alkylene group, an arylene group or an aralkylene group having —$SO_3M$ as a substituent if $R_7$ is not —$SO_3M$; and M denotes a counter cation of a sulfonic group, general formula (4)

wherein each of $R_1$ through $R_4$ independently denotes a hydrogen atom, an alkyl group that may be substituted, an aryl group that may be substituted or an aralkyl group that may be substituted, each of $R_5$ and $R_6$ independently denotes a hydrogen atom or an alkyl group, $R_7$ denotes a hydrogen atom, a sulfonic acid group, an amino group that may be substituted or —$SO_3X$; n denotes an integer between 1 and 3; at least one of the $R_1$ through $R_4$ is an alkylene group, an arylene group or an aralkylene group having —$SO_3X$ as a substituent if $R_7$ is not —$SO_3X$; and X denotes a halogen atom.

2. A method of manufacturing a colorant compound, comprising a step of causing a sulfonylhalide compound having a structure as represented by general formula (4) below and an amine having a structure as represented by general formula (5) below to react with each other to conduct condensation reaction:

general formula (4)

wherein each of $R_1$ through $R_4$ independently denotes a hydrogen atom, an alkyl group that may be substituted, an aryl group that may be substituted or an aralkyl group that may be substituted, each of $R_5$ and $R_6$ independently denotes a hydrogen atom or an alkyl group, $R_7$ denotes a hydrogen atom, a sulfonic acid group, an amino group that may be substituted or —$SO_3X$; n denotes an integer between 1 and 3; at least one of the $R_1$ through $R_4$ is an alkylene group, an arylene group or an aralkylene group having —$SO_3X$ as a substituent if $R_7$ is not —$SO_3X$; and X denotes a halogen atom,

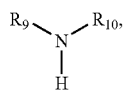 general formula (5)
wherein each of $R_9$ and $R_{10}$ independently denotes a hydrogen atom, an alkyl group, an aryl group or an aralkyl group and may form a heterocycle with a nitrogen atom.
\* \* \* \* \*